US008954975B2

(12) United States Patent
Kim et al.

(10) Patent No.: US 8,954,975 B2
(45) Date of Patent: Feb. 10, 2015

(54) TASK SCHEDULING METHOD FOR REAL TIME OPERATING SYSTEM

(75) Inventors: Sang Cheol Kim, Gyeongsangbuk-do (KR); Duk Kyun Woo, Daejeon (KR); Gyu Sang Shin, Daejeon (KR); Pyeong Soo Mah, Daejeon (KR); Seon Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 244 days.

(21) Appl. No.: 13/571,766

(22) Filed: Aug. 10, 2012

(65) Prior Publication Data

US 2013/0117756 A1    May 9, 2013

(30) Foreign Application Priority Data

Nov. 8, 2011    (KR) ........................ 10-2011-0115854

(51) Int. Cl.
*G06F 9/46*    (2006.01)
*G06F 9/48*    (2006.01)

(52) U.S. Cl.
CPC .................................. *G06F 9/4887* (2013.01)
USPC ....................................................... 718/103

(58) Field of Classification Search
None
See application file for complete search history.

(56) References Cited

U.S. PATENT DOCUMENTS

| 7,076,781 | B2 * | 7/2006 | Skovira .......................... 718/102 |
| 2004/0054999 | A1 * | 3/2004 | Willen et al. .................. 718/103 |
| 2007/0005530 | A1 * | 1/2007 | Baartman et al. ............... 706/16 |
| 2008/0209423 | A1 * | 8/2008 | Hirai .............................. 718/102 |
| 2011/0154350 | A1 * | 6/2011 | Doyle et al. ................... 718/104 |
| 2012/0198462 | A1 * | 8/2012 | Cham et al. .................... 718/103 |

FOREIGN PATENT DOCUMENTS

| KR | 10-2004-0011006 | 2/2004 |
| KR | 10-2008-0029353 | 4/2008 |
| KR | 10-2010-0060312 | 6/2010 |

* cited by examiner

*Primary Examiner* — Emerson Puente
*Assistant Examiner* — Sisley Kim
(74) *Attorney, Agent, or Firm* — Staas & Halsey LLP (57) ABSTRACT

The present invention relates to a task scheduling method for a real time operating system (RTOS) mounted to an embedded system, and more particularly, to a task scheduling method which allows a programmer to make a CPU reservation for a task. The task scheduling method for a real time operating system, includes: at a scheduling time point, determining whether or not a highest priority of tasks present in a ready queue is a predetermined value K; if the highest priority is determined to be K, applying a reservation based scheduler to perform a scheduling; and if the highest priority is determined not to be K, applying a priority based scheduler to perform a scheduling; the tasks present in the ready queue, the priority of which is K, contains idle CPU reservation allocation information received as a factor when the tasks the priority of which is K are created.

7 Claims, 6 Drawing Sheets

TASK SCHEDULING METHOD FOR REAL TIME OPERATING SYSTEM

CROSS-REFERENCE TO RELATED APPLICATIONS

This application claims priority to and the benefit of Korean Patent Application No. 10-2011-0115854 filed in the Korean Intellectual Property Office on Nov. 8, 2011, the entire contents of which are incorporated herein by reference.

TECHNICAL FIELD

The present invention relates to a task scheduling method for a real time operating system (RTOS) mounted to an embedded system, and more particularly, to a task scheduling method which allows a programmer to make a CPU reservation for a task.

BACKGROUND ART

Most real time operating systems mounted to embedded systems employ a preemptive task scheduling method based on a priority. The real time operating systems employ a round robin task scheduling method where a task having arrived first is executed first when the priority of tasks are the same. As described above, the preemptive round robin task scheduling methods are intuitive to programmers, and thus are generally widely used.

However, the priority based scheduling methods are not always the best solutions. In particular, when an execution time of a task having a high priority is very long, a task having a low priority needs to wait until the task of the high priority is completely executed, which may cause the task having the low priority not to be executed. If a program is performed, an execution time of a task may become longer and even an unlimited loop may be encountered. Thus, it is not so pleasant for a programmer to determine a priority of a task except for when the task needs to be urgently executed.

It is round robin scheduling that has been suggested to solve the priority based problem. Even execution times of tasks become longer or are blocked, time division equally provides opportunities for executing tasks. In this case, when the number of tasks is n and the n tasks are executed in the form of round robin, a CPU occupancy rate of one task becomes 1/n, making it impossible to usefully use a CPU.

SUMMARY OF THE INVENTION

The present invention has been made in an effort to provide a task scheduling method where in scheduling tasks, if the priorities of tasks are different, a priority based scheduling is applied, if the priorities of tasks are the same, a time division based scheduling is applied, and if a CPU allocation is designated (reserved), the reservation is allocated, whereby a more degree of freedom of scheduling can be given to a programmer.

An exemplary embodiment of the present invention provides a task scheduling method for a real time operating system, including: at a scheduling time point, determining whether or not a highest priority of tasks present in a ready queue is a predetermined value K; if the highest priority is determined to be K, applying a reservation based scheduler to perform a scheduling; and if the highest priority is determined not to be K, applying a priority based scheduler to perform a scheduling; the tasks present in the ready queue, the priority of which is K, contains idle CPU reservation allocation information received as a factor when the tasks the priority of which is K are created.

According to the exemplary embodiment of the present invention, in scheduling tasks, if the priorities of the tasks are different, a priority based scheduling is applied, if the priorities of the tasks are the same, a time division based scheduling is applied, and if a CPU allocation is reserved, the reservation is allocated, whereby a more degree of freedom of scheduling can be given to a programmer. Thus, a soft real time application can be realized more easily than an existing scheduling method by allowing a programmer to control use of a CPU in the case of a real time task.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a task scheduling method for a real time operating system according to an exemplary embodiment of the present invention will be described with reference to the accompanying drawings.

Prior to a detailed description of the present invention, basic assumptions will be described as follows.

Basic Assumptions

1) An operating system provides several priorities and all tasks have priorities of their own. A task having a high priority has an execution priority higher than that of a task having a low priority. A set of tasks a priority of which is X is defined $T_x$. A priority value of a specific task $t_j$ is denoted Prio($t_j$), $t_j \in T_x$. Throughout the specification, it is assumed that a task having a high priority has a high priority (positive method).

2) Among the priorities provided by the operating system, one specific priority (for example, K) may correspond to several tasks and the remaining priorities except for K may correspond to only one task, respectively.

3) The priority K corresponds to several tasks ($T_k = \{T_1, \ldots, T_n\}$ and the tasks having the same priority are executed through a time division method.

4) There are a one-time-execution form where a task is completed some time once the task is executed and a forever-loop form where a task is continuously executed forever without ending.

5) In the system, most of the tasks have a priority of K and several urgent tasks have priorities higher than K. The urgent tasks are in the one-time-execution form.

6) If it is assumed that a total sum of CPU occupancy rates of the tasks having priorities higher than K is Z (%), a percent of idle CPU time that can be used by the tasks having the priority of K is (100−Z) (%). This is defined as a percent of idle CPU time for K.

Figure 1:
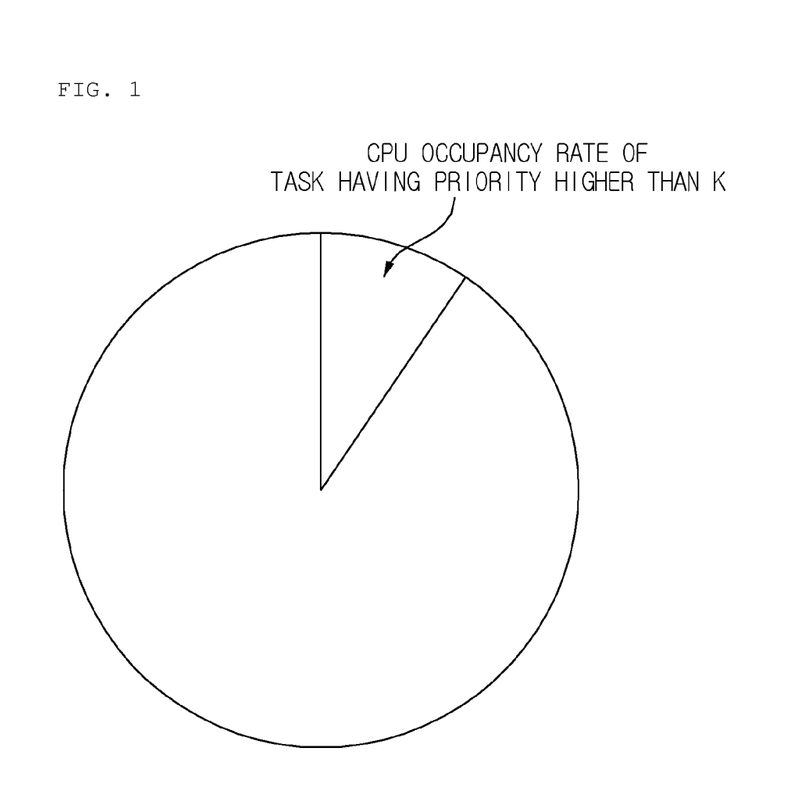
FIG. 1 is a view illustrating a percent of idle CPU time for a task having a priority of K in a task scheduling method for a real time operating system according to an exemplary embodiment of the present invention.

Note) A percent of the left idle CPU time that can be used by tasks having a priority of K is defined as a percent of idle CPU time for K. The percent of idle CPU time for K corresponds to a portion of FIG. 1 except for the CPU occupancy rate of the task having a priority higher than K. Hereinafter, an idle CPU allocation is calculated while taking the idle CPU percent as 100%. That is, if an idle CPU allocation is 30%, an actual value thereof is 0.3*(100−Z). Here, Z (%) is a sum of the CPU occupancy rates of the tasks having priorities higher than K.

7) The scheduling (context exchanging) time points are a time when a scheduling timer is ended, a time when a task is completed, a time when a new task is activated, and a time when a scheduling instruction is explicitly called during execution of a task.

Creation of Task

1) When created, a task receives a priority and an idle CPU reservation allocation as factors. When the priority is not K, the idle CPU reservation allocation needs to be necessarily NULL, and when the priority is K, a factor such as 10(%) or 20(%) may be given to the idle CPU reservation allocation. If a reservation is not necessary, a factor of 0 may be given.

Example 1) task_create(tid1, stack_size, priority=K, 10)←10% Reserved

Example 2) task_create(tid2, stack_size, priority=K+1, 0)←Reservation unnecessary Example 3) task_create(tid3, stack_size, priority=K, 0)←Reservation unnecessary 2) For the tasks having a priority of K, the idle CPU reservation allocation is an integer value larger than 0 and equal to or smaller than 100. A sum of all idle CPU reservation allocations of the tasks having the priority of K should not exceed 100(%). An idle CPU reservation allocation of a specific task $t_i$ is denoted by CPU($t_i$), $t_i \in t_k$.

Entire Algorithm of the Present Invention

Figure 2:
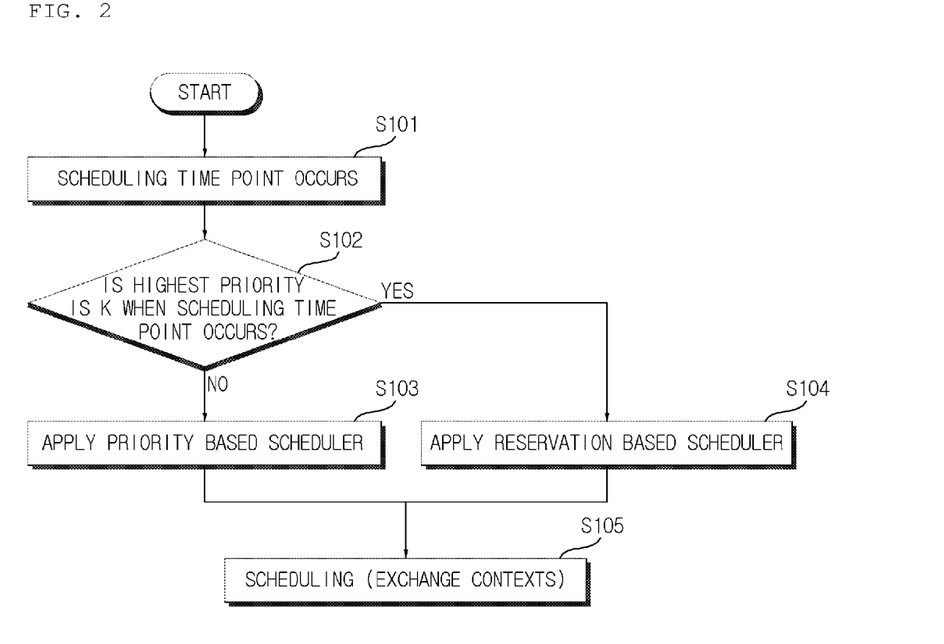
FIG. 2 is a flowchart illustrating an entire algorithm of the task scheduling method for a real time operating system according to the exemplary embodiment of the present invention.

An entire algorithm of the task scheduling method for a real time operating system according to the present invention is as illustrated in FIG. 2. The object tasks are a set of tasks which are being currently executed and tasks which are being prepared at a scheduling time point. The scheduling time point refers to an instant when a scheduling is performed, and is a time when a new task enters the ready queue, a time when a currently executed task is completed, or a time when a timer is ended (in a time division based scheduling).

At the scheduling time point, a highest priority of the tasks present in the ready queue is examined and it is determined whether or not the highest priority is K (S101 and S102).

If the highest priority is not K, a scheduling is performed after a priority based preemptive scheduler is applied. In this case, several tasks having the same priority are not present, the task having the highest priority among the object tasks needs to be allocated to CPU select=$t_i$, $t_i \in T_k$. Here, $t_i$ is a task having the highest priority among the object tasks (S103 and S105). Meanwhile, if the highest priority is K, a scheduling is performed after a reservation based scheduler is applied (S104 and S105). The reservation based scheduler will be described in detail as follows.

In the following description, a set of tasks having an idle CPU reservation allocation among the tasks pertaining to $T_K$ will be denoted by $T_{CPU}$ and a set of tasks not having an idle CPU reservation allocation will be denoted by $T_G$ ($T_{CPU}, T_G \subset T_K, T_{CPU} \cup T_G = T_K, T_{CPU} \cap T_G = \emptyset$).

Time division is made at a predetermined interval to schedule the tasks to pertaining to $T_K$. The time division may be made by using a time ending timer provided by the system.

Figure 3:
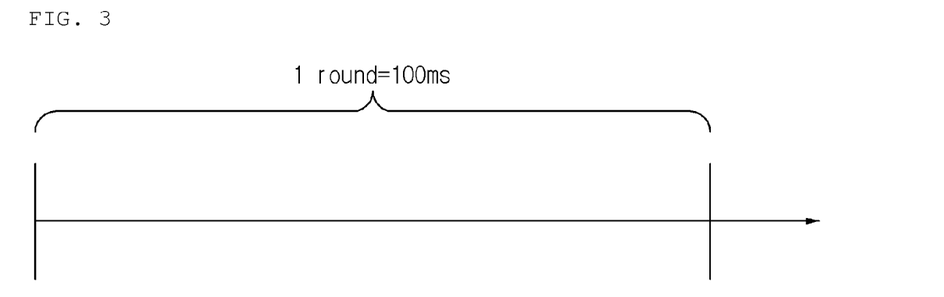
FIG. 3 is a flowchart illustrating an example of a first round of a task scheduling method for a real time operating system according to an exemplary embodiment of the present invention.

A first round is set to perform a reservation based scheduling. The first round is a window considered when an idle CPU time is reserved. The first round may be set as a specific time value, but is preferably 100[ms] as in FIG. 3, considering a scheduling context exchanging time of a Linux operating system.

Initialization Process in Reservation Based Scheduling

Figure 4:
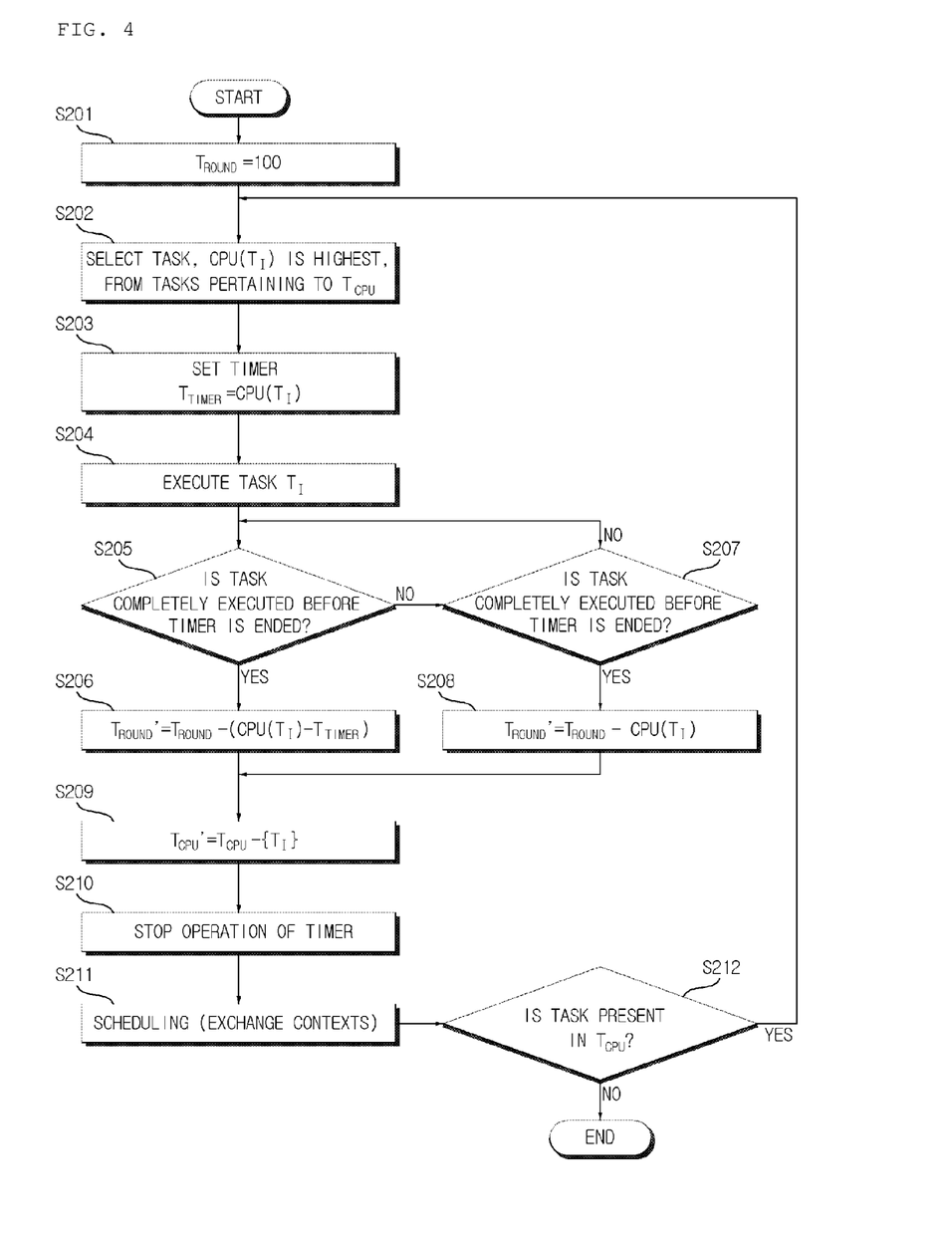
FIG. 4 is a flowchart illustrating an algorithm of allocating a task pertaining to $T_{CPU}$ in the task scheduling method for a real time operating system according to the exemplary embodiment of the present invention.

1) A time for the first round is set when a round time is not set (S201 of FIG. 4).

2) $T_{CPU}$ and $T_G$ are set.

After the initialization process, the tasks pertaining to $T_{CPU}$ is allocated to the first round and then the tasks pertaining to $T_G$ is allocated. Hereinafter, an algorithm for allocating the tasks pertaining to $T_{CPU}$ will be described with reference to FIG. 4 and an algorithm for allocating the tasks pertaining to $T_G$ will be described with reference to FIG. 5. Hereinafter, even though a case where a round time is 100 [ms] is exemplified for convenience' sake in a description of the algorithm for allocating the tasks pertaining to $T_{CPU}$, the present invention is not limited thereto.

Algorithm for Allocating Tasks Pertaining to $T_{CPU}$

First, a task, an idle CPU reservation allocation value CPU ($t_i$) is highest, is selected from the tasks pertaining to $T_{CPU}$. If the number of tasks, a CPU($t_i$) value of which is the same, is plural, an arbitrary task ($t_i \in T_{CPU}$) is selected from the tasks (S202 of FIG. 4).

Next, a timer is set ($T_{timer}$=CPU ($t_i$)). The timer is decreased by one whenever 1 [ms] elapses (S203).

Next, the task $t_i(t_i \in T_{CPU})$ is executed (S204).

Next, if the allocated task is completely executed before the timer is ended, the execution time of the task is subtracted from the round time and an operation of the timer is stopped. That is, $T_{round}'$ is set to be $T_{round}-(CPU(t_i)-t_{timer})$. Then, the task is removed from $T_{CPU}$ (that is, $T_{CPU}'=T_{CPU}-\{t_i\}$). Thereafter, another task is executed by performing a scheduling (S205, S206, S209, S210 and S211).

Meanwhile, if the timer is ended before the task is completely executed, it means that the idle CPU reservation allocation is completely used, and $T_{round}'$ becomes $T_{round}$−CPU ($t_i$) and the task is removed from $T_{CPU}$ (that is, $T_{CPU}'=T_{CPU}-$ {$t_i$}). Then, an operation of the timer is stopped. Thereafter, another task is executed by performing a scheduling (S207, S208, S209, S210 and S211).

Next, it is determined whether or not a task is present in $T_{CPU}$ (S212), the above-described steps are repeated until a task is not present in $T_{CPU}$.

After all the tasks pertaining to $T_{CPU}$ are allocated through the above-described steps and $T_{round}>0$, the tasks pertaining to $T_G$ may be allocated by the remaining time. With the assumption that the tasks pertaining to $T_G$ is in the form of a list, the algorithm of allocating the tasks will be described as follows with reference to FIG. 5. Then, a maximum time which can be used by each task is assumed to be 10 [ms].

Figure 5:
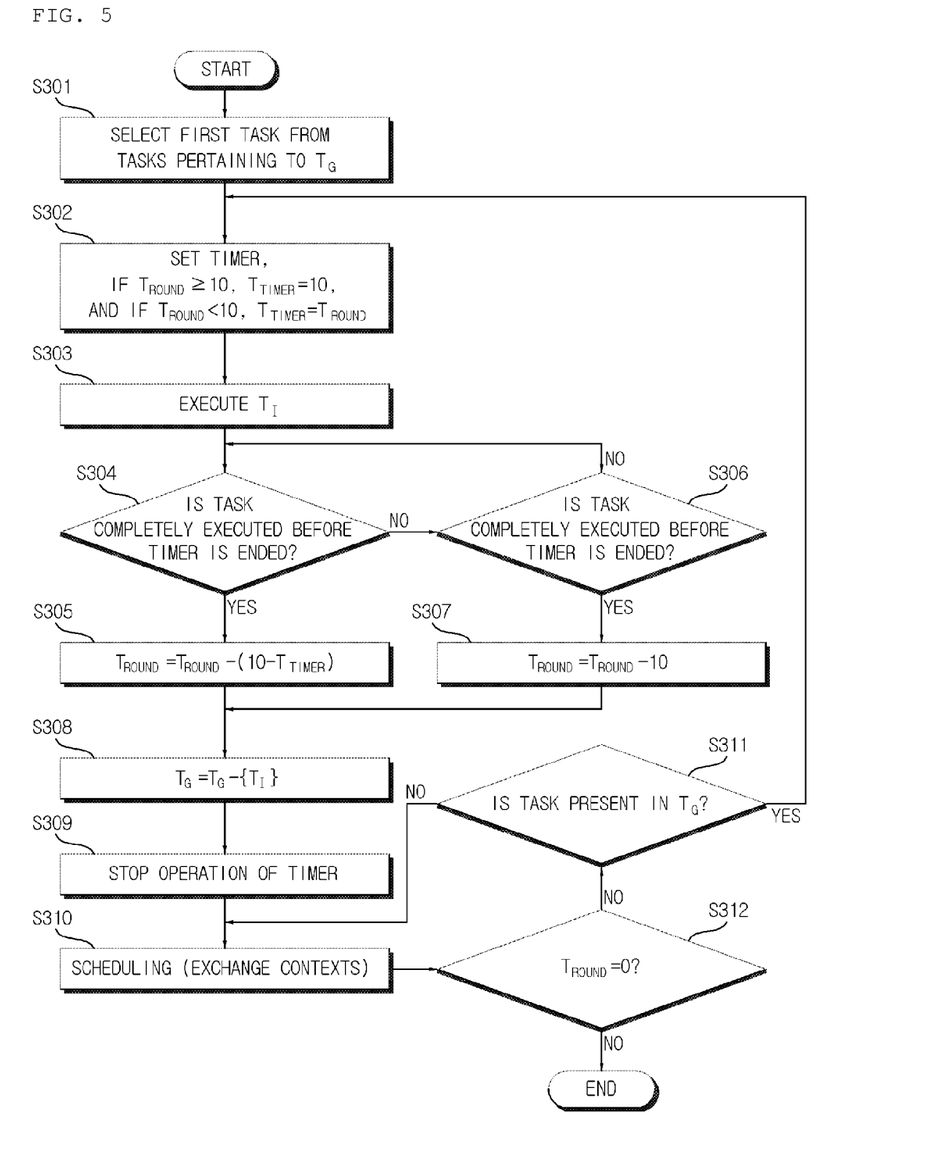
FIG. 5 is a flowchart illustrating an algorithm of allocating a task pertaining to $T_G$ in the task scheduling method for a real time operating system according to the exemplary embodiment of the present invention.

Algorithm for Allocating Tasks pertaining to $T_G$ First, a first task $t_i(t_i \epsilon T_{CPU})$ is selected from the tasks pertaining to $T_G$ (S301).

Next, a timer is set. Then, if $T_{round} \geq 10$, $T_{timer}$ is set to be 10, and if $T_{round}<10$, $T_{timer}$ is set to be $T_{round}$. The timer is decreased by one whenever 1 [ms] elapses (S302).

Next, the task $t_i(t_i \epsilon T_G)$ is executed (S303).

Next, if the allocated task are completely executed before the timer is ended, the execution time of the task is subtracted from the round time (that is, $T_{round}'=T_{round}-(10-T_{timer})$), the task is removed from $T_G$ (that is, $T_G'=T_G-\{t_i\}$), and an operation of the timer is stopped. Thereafter, a scheduling is performed (S304, S305, S308, S309, and S310).

Meanwhile, if the timer is ended before the task is completely executed, it means that the task executable time of 10 [ms] are completely used, and $T_{round}'$ becomes $T_{round}-10$ and $T_i$ is disposed at a final part of the $T_G$ list. Thereafter, an operation of the timer is stopped and a scheduling is performed (S206, S307, S308, S309, and S310).

Next, it is determined whether or not a task is present in $T_G$ (S311), the above-described steps are repeated until $T_{round}$ becomes 0 only if a task is present in $T_G$ and the next round is started if $T_{round}$ becomes 0. The tasks which have not been allocated may be allocated in the next round.

When $T_{round}>0$ but a task is not present in $T_G$, $T_{timer}$ is set to be $T_{round}$ and a scheduling is performed, and a CPU control right is succeeded by a task having a lower priority. If the timer is ended and $T_{round}$ becomes 0, the next round is started.

When Task Having Priority Higher than K Is Encountered during Execution of Task Pertaining to $T_K$ If a task having a priority higher than K is encountered, a priority based scheduler is applied and the task having a priority higher than K is executed first.

Figure 6:
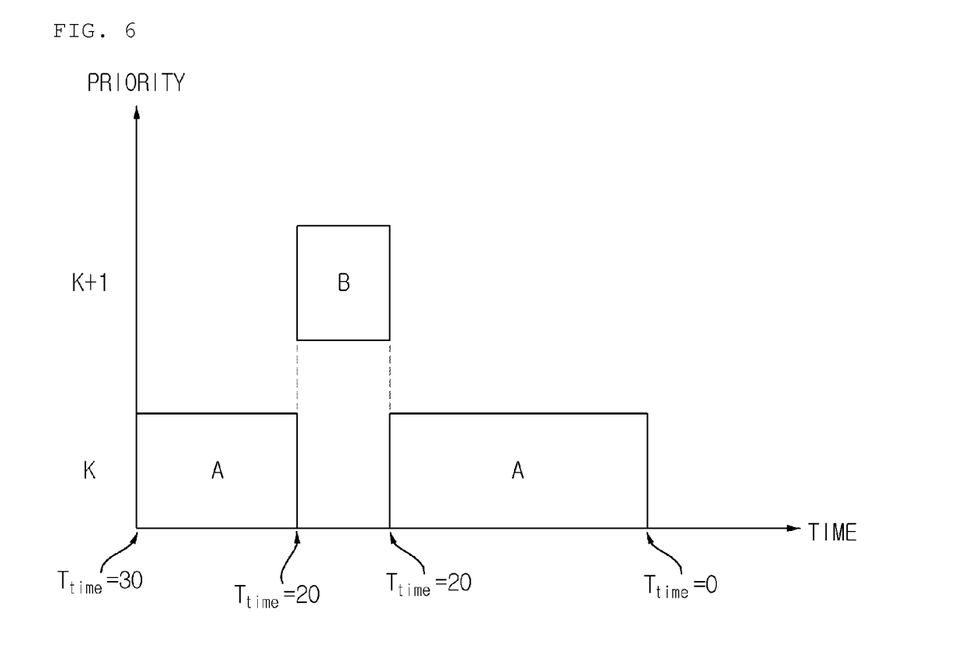
FIG. 6 is a view illustrating a case where a task having a priority higher than K is encountered while a task pertaining to $T_K$ is executed in the task scheduling method for a real time operating system according to the exemplary embodiment of the present invention.

A timer value needs to be carefully dealt with when all the tasks having priorities higher than K are executed and a task having a priority of K is executed again. That is, as illustrated in FIG. 6, if a scheduling is performed after a task having a higher priority is encountered, the value is recovered when $T_{timer}$ is temporarily stored in another parameter ($X=T_{timer}$) and is recovered ($T_{timer}=X$). If an interrupt occurs, $T_{timer}$ needs to be stopped until the interrupt is completely processed.

Hereinafter, an example is suggested to help understanding of the present invention. Through the example suggested below, a comparison result of a case of performing a reservation based scheduling according to the present invention (FIG. 7A) and a case of not performing a reservation based scheduling according to the related art (FIG. 7B) can be seen.

Figure 7A:
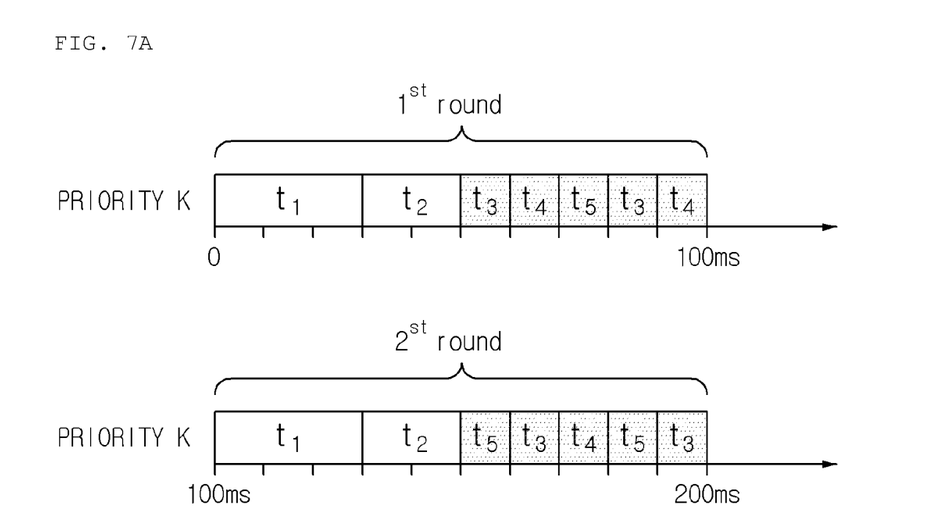
FIGS. 7A and 7B are views for comparing a case where a reservation based scheduling in the task scheduling method for a real time operating system according to the exemplary embodiment of the present invention is performed with another case.
Figure 7B:
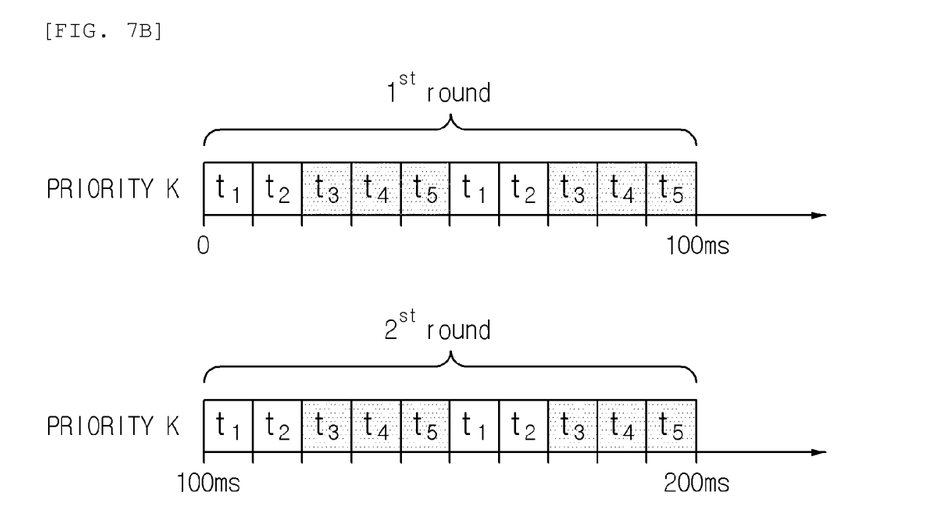

Example) It is assumed that $T_K=\{t_1, t_2, t_3, t_4, t_5\}$, $t_1$ is an audio task, $t_2$ is a video task, $t_3$ is a system monitoring task, $t_4$ is an event ready task, $t_5$ is a packing transmitting/receiving task, $T_{CPU}=\{t_1, t_2\}$, $T_G=\{t_3, t_4, t_5\}$, CPU($t_1$)=30, CPU($t_2$)=20, tasks of $T_K$ are forever-loop tasks. $t_1$ and $t_2$ pertaining to $T_{CPU}$ are real time tasks, and $t_3$, $t_4$ and $t_5$ pertaining to $T_G$ are non-real time tasks.

Referring to FIGS. 7A and 7B, when a reservation based scheduling is performed according to the present invention, it takes 110 [ms] for $t_1$ to be performed by 40 [ms], whereas a round robin scheduling is performed according to the related art, it takes 160 [ms] for $t_1$ to be performed by 40 [ms]. As described above, since an object of a real time task is to perform a task within a desired finishing time, a desired finishing time and an execution time of a real time task can be met with a higher possibility by using a reservation based scheduling method.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A task scheduling method for a real time operating system, comprising:
   at a scheduling time point, determining whether or not a highest priority of tasks present in a ready queue is a predetermined value K;
   if the highest priority is determined to be K, applying a reservation based scheduler to perform a scheduling; and
   if the highest priority is determined not to be K, applying a priority based scheduler to perform a scheduling,
   wherein the applying a reservation based scheduler to perform the scheduling comprises:
   determining whether or not the tasks, the priority of which is K, have idle CPU reservation allocation information; and
   performing the scheduling of tasks having the idle CPU reservation allocation information and the scheduling of tasks not having the idle CPU reservation allocation information in sequence,
   wherein the applying a reservation based scheduler to perform the scheduling comprises:
   when a round time is not set, setting a time for a first round;
   setting the tasks, the priority of which is K, to a set $T_{CPU}$ of tasks having the idle CPU reservation allocation information and a set $T_G$ of tasks not having the idle CPU reservation allocation information; and
   allocating an idle CPU to tasks pertaining to the set $T_{CPU}$, and allocating the idle CPU to tasks pertaining to the set $T_G$,
   wherein the idle CPU is a percentage of the left CPU time usable by the tasks, the priority of which is K, except for the CPU occupancy rate of the task, the priority of which is higher than K.

2. The task scheduling method of claim 1, wherein the scheduling time point is a time when a new task enters the ready queue, a time when a currently executed task is completed, or a time when a timer is ended.

3. The task scheduling method of claim 1, wherein the allocating of the idle CPU to the tasks pertaining to $T_{CPU}$ comprises:
  selecting a task, an idle CPU reservation allocation value of which is highest, from the tasks pertaining to $T_{CPU}$;
  setting a timer value of the task selected in the selecting of the task to be identical with an idle CPU reservation allocation value;
  executing the task selected in the selecting of the task;
  if the task selected in the selecting of the task is completely executed before the timer is ended, subtracting an execution time of the task from a round time, stopping an operation of the timer, and removing the task from $T_{CPU}$, and if the timer is ended before the task selected in the selecting of the task is completely executed, subtracting an idle CPU reservation allocation value of the task from a round time, stopping an operation of the timer, and removing the task from $T_{CPU}$; and
  performing a scheduling, determining whether or not a task exists in $T_{CPU}$, and if a task exists, sequentially performing the steps, starting from the selecting of the task, and if a task does not exist, ending the step.

4. The task scheduling method of claim 3, wherein in the selecting of the task, an idle CPU reservation allocation value $CPU(t_i)$ of which is highest, from the tasks pertaining to $T_{CPU}$, the number of tasks, a $CPU(t_i)$ value of which is the same, is two or more, selecting an arbitrary task.

5. The task scheduling method of claim 1, wherein the allocating of an idle CPU to the tasks pertaining to $T_G$ comprises:
  selecting a first task from the tasks pertaining to $T_G$;
  if a round time is equal to or larger than a predetermined value p, setting the timer value to p, and if the round time is smaller than p, setting the timer value to be identical with the round time;
  executing the task selected in the selecting of the first task;
  if the task selected in the selecting of the first task is completely executed before the timer is ended, subtracting the execution time of the task from the round time, stopping an operation of the timer, and removing the task from $T_G$, and if the timer is ended before the task selected in the selecting of the first task is completely executed, subtracting p from the round time and disposing the task at an end of $T_G$; and
  performing a scheduling, determining whether or not a task exists in $T_G$, and if a task exists, sequentially performing the steps, starting from the selecting of the first task, and if a task does not exist, ending the step.

6. The task scheduling method of claim 5, wherein when a task, a priority of which is higher than K, enters a ready queue while the task selected in the selecting of the first task is executed, executing first the task, a priority of which is higher than K, and returning to the execution of the task selected in the selecting of the first task.

7. The task scheduling method of claim 6, wherein when a task, a priority of which is higher than K, enters a ready queue while the task selected in the selecting of the first task is executed, temporarily storing a timer value in another parameter and returning the value stored in the parameter when returning to the execution of the task selected in the selecting of the first task.

* * * * *